United States Patent [19]

Yoshimura et al.

[11] 4,134,957
[45] Jan. 16, 1979

[54] METHOD OF STRETCHING POLYPROPYLENE FILMS

[75] Inventors: Shohei Yoshimura; Tutomu Isaka, both of Inuyama, Japan

[73] Assignee: Toyobo Co., Ltd., Osaka, Japan

[21] Appl. No.: 878,438

[22] Filed: Feb. 16, 1978

Related U.S. Application Data

[63] Continuation of Ser. No. 640,797, Dec. 15, 1975, abandoned, which is a continuation-in-part of Ser. No. 420,442, Nov. 30, 1973, abandoned, which is a continuation of Ser. No. 191,856, Oct. 22, 1971, abandoned.

[30] Foreign Application Priority Data

Oct. 26, 1970 [JP] Japan .................................. 45-94093

[51] Int. Cl.² ............................................... B29C 17/02
[52] U.S. Cl. ..................................... 264/288; 264/289
[58] Field of Search ............... 264/288, 289, 346, 235, 264/DIG. 73, 210 R; 26/51

[56] References Cited

U.S. PATENT DOCUMENTS

| 2,547,763 | 4/1951 | Land et al. | 264/288 |
| 3,177,277 | 4/1965 | Adams et al. | 264/210 R |

Primary Examiner—James B. Lowe
Attorney, Agent, or Firm—Birch, Stewart, Kolasch and Birch

[57] ABSTRACT

Biaxially oriented thermoplastic films, for example polypropylene films, are further stretched in one direction in a stretching zone having a distance in the direction of stretching which is greater than the breadth of said film. As a result, stretched films having a uniform thickness in the breadthwise direction are obtained in a high yield rate.

15 Claims, 6 Drawing Figures

METHOD OF STRETCHING POLYPROPYLENE FILMS

This application is a continuation of application Ser. No. 640,797, filed Dec. 15, 1975, now abandoned; which is a continuation-in-part application of application Ser. No. 420,442, filed Nov. 30, 1973, now abandoned; which is a continuation application of application Ser. No. 191,856, filed Oct. 22, 1971, now abandoned.

The present invention relates to a method for stretching a plastic film. More particularly, it relates to a method for stretching a biaxially oriented synthetic resin film in one direction in a stretching zone having a distance that is larger than the breadth of said film.

It has been known in the art that a biaxially oriented film can be stretched in one direction to produce a biaxially oriented film having a high tensile strength in one direction (U.S. Pat. No. 3,177,277). Generally, when a plastic film is stretched in the longitudinal direction, it in turn shrinks in the direction perpendicular thereto, i.e. the latitudinal direction, with the result that both edge portions of the film become relatively thick. These thickened edge portions must be cut off. Hence, in order to minimize the variation in film thickness, a stretching zone arranged to be much narrower than the breadth of the film has been conventionally employed in the art, whereby stretching is conducted in the longitudinal direction. In the above-cited prior art, the practice of stretching in the longitudinal direction in a stretching zone which is much narrower than the breadth of the film is also employed in the case of stretching a biaxially oriented film in one direction. The resulting thick portions at both edges of the film have to be cut off, resulting in a low efficiency and yield.

One of the objects of the present invention is to provide a method for stretching a biaxially oriented synthetic resin film which overcomes the disadvantages and drawbacks of the prior art method.

Another object of the present invention is to provide a method for drawing or stretching biaxially oridented film which gives a stretched film having a uniform thickness.

A further object of the invention is to provide a method for stretching a biaxially oriented synthetic film efficiently and in a high yield.

These and other objects and advantages of the present invention will become apparent to those skilled in the art from a consideration of the following specification and claims, taken in conjunction with the accompanying drawings, wherein:

In accordance with the present invention, it has been found that if a biaxially oriented film is stretched in a stretching zone covering a distance greater than the breadth of the film and, simultaneously, the film is given sufficient shrinkage in one direction, a film having a uniform thickness in the breadthwise direction is obtained, thereby eliminating the necessity of trimming off thick portions, as had been done in the prior art, efficiently and in a high yield. Furthermore, the thus-obtained film has a greater tensile strength and a lower elongation for the same stretching ratio.

It could not be expected from the knowledge of the prior art that the use of a stretching zone wider than the breadth of the film would provide these advantages in the case of stretching a biaxially oriented film in one direction. The films obtained in accordance with the method of this invention are suitable for use as magnetic tapes, condenser tapes and the like, where high accuracy is required with respect to evenness in film thickness and mechanical properties.

Among various kinds of thermoplastic films to which the method of this invention can be applied are polyolefins such as polyethylene, polypropylene, polybutene-1 and the like, linear polyesters such as polyethylene terephthalate, polyethylene terephthalate isophthalate copolymer and the like, polyamides such as nylon 6, nylon 66, polyxylylene adipamide and the like, vinyl resins such as polyvinyl chloride, polyvinylidene chloride, polyvinyl alcohol, polyacrylonitrile, polystyrene and the like, polycarbonates, etc. Conventional additives, such as antistatic agents, lubricants, anti-blocking agents, plasticizers, dyes, pigments, stabilizers and the like, may be incorporated into these films as is well known in the art.

Figure 1A:
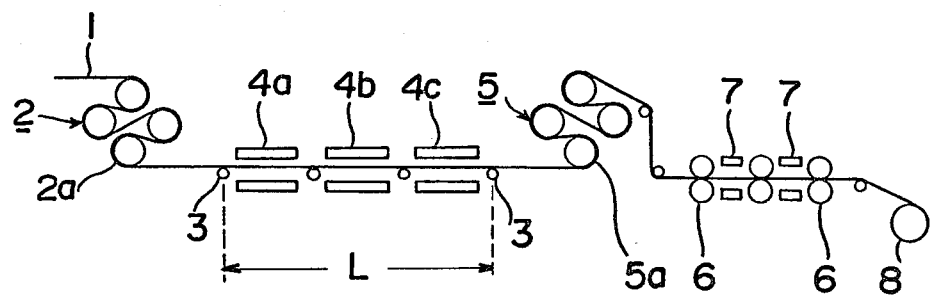
FIGS. 1A and 1B illustrate one of the embodiments of the method of the present invention.
Figure 1B:
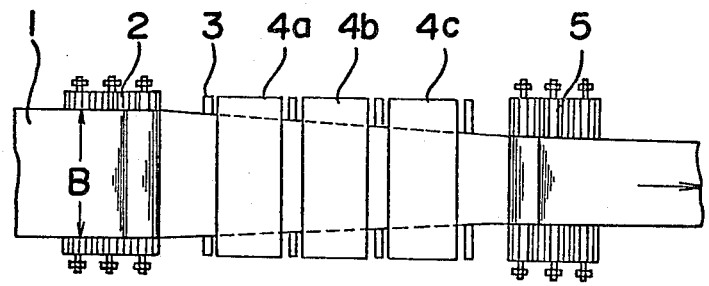

With the reference to the embodiment shown in FIGS. 1A and 1B, a biaxially oriented film 1, after passing through a group of low speed rollers 2, travels over a plurality of supporting rollers 3, passes through a group of high speed rollers 5, and then is wound onto a winding roller 8 through a plurality of heat setting rollers 6. Heating devices 4a, 4b and 4c are provided between the low speed roller group 2 and the high speed roller group 5. Film 1 is stretched in the stretching zone between the last roller 2a of the low speed roller group 2 and the first roller 5a of the high speed roller group 5 while being heated by means of the heating devices 4a, 4b and 4c. The resultant stretched film 1 is heat-set by means of a plurality of heat-setting devices 7 which are provided between the high speed roller group 5 and the winding roller 8. The distance L of the stretching zone between low speed roller 2a and a high speed roller 5a (i.e., between the supporting roller 3 at one end and the supporting roller 3 at the other end) is arranged so as to be larger than the breadth B of the biaxially oriented film.

To ensure an accurate stretching operation between the low speed roller group 2 and the high speed roller group 5, it is preferable that the film be passed in a zig-zag manner through the plurality of rollers so as to eliminate the possibility of slippage through the rollers. Heating of the film between the low speed roller group and the high speed roller group is effected over the entire stretching zone. For this purpose, two or more heating units are usually provided at intervals of about 10 to 40 cm. The source of heating may be selected as desired. For example, hot air, infrared rays, electrical heating means, steam or the like may be suitably employed. The heating temperature is usually kept substantially constant above the second order transition point of the film, but lower than the melting point thereof, throughout the stretching zone. As an alternative, the heating temperature may be varied in accordance with the stretching tension of the film. In the case where the temperatures of heating devices 4a, 4b and 4c are varied from one to another, it is preferable to adjust the respective temperatures so that the temperature is highest at the heating device 4b with a downward variation of temperature in the direction of heating device 4c and heating device 4a. The applicable temperatures of the respective heating devices vary according to the kinds of film employed, for example, as follows:

| Film | Polypropylene | Polyethylene terephthalate |
|---|---|---|
| 4a | 60 – 145° C | 80 – 180° C |
| 4b | 145 – 165° C | 160 – 200° C |
| 4c | 100 – 155° C | 100 – 180° C |
| 7 (heat setting) | 155 – 170° C | 150 – 250° C |

The supporting rollers, a plurality of which are provided in the stretching zone, are designed to rotate lightly as the film passes along so as to reduce the friction thereof against the film. This can be accomplished by covering the surfaces of these rollers with, for example, Teflon (polytetrafluoroethylene) adhesive tape or by coating them with Teflon or a silicone material. It is desirable that the supporting rollers be arranged so that they will more or less hold up the film or, otherwise, the film may hang down when it is run through the rollers. If the friction of the supporting rollers against the film is relatively large, the shrinkage in the breadth of the film may be retarded and the stretching process may be adversely affected.

In accordance with this invention, the length L of the stretching zone, wherein a biaxially oriented film is stretched in one direction, is greater than the breadth B of the film, and while the film is stretched in one direction as it is conveyed through the stretching zone, it shrinks in the other direction. Generally, it is preferable to use as high a ratio of L/B as is possible, but it does not follow that the performance of the stretching operation will improve infinitely as the L/B ratio increases.

Figure 2:
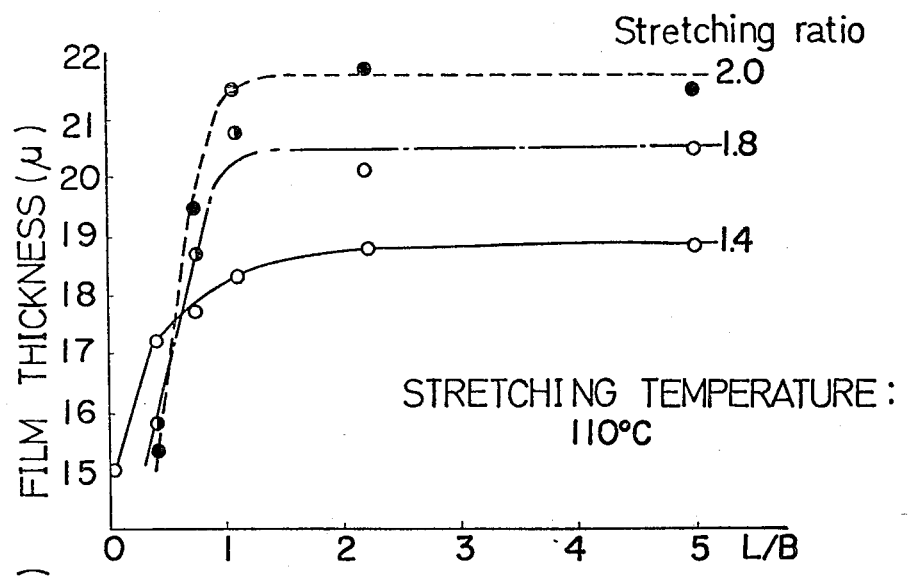
FIG. 2 is a graph showing the relationship between the length/breadth ratio (L/B) and film thickness.
Figure 3:
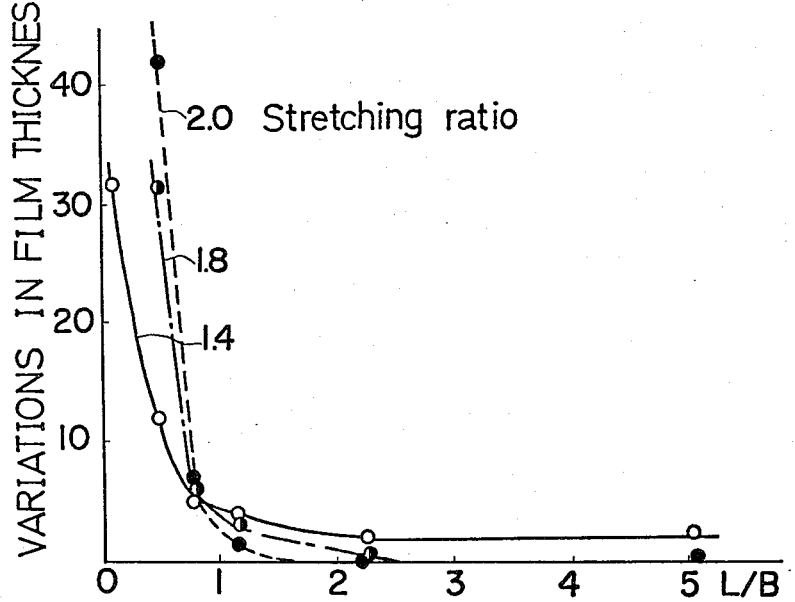
FIG. 3 is a graph showing the relationship between L/B and variations in film thickness.
Figure 4:
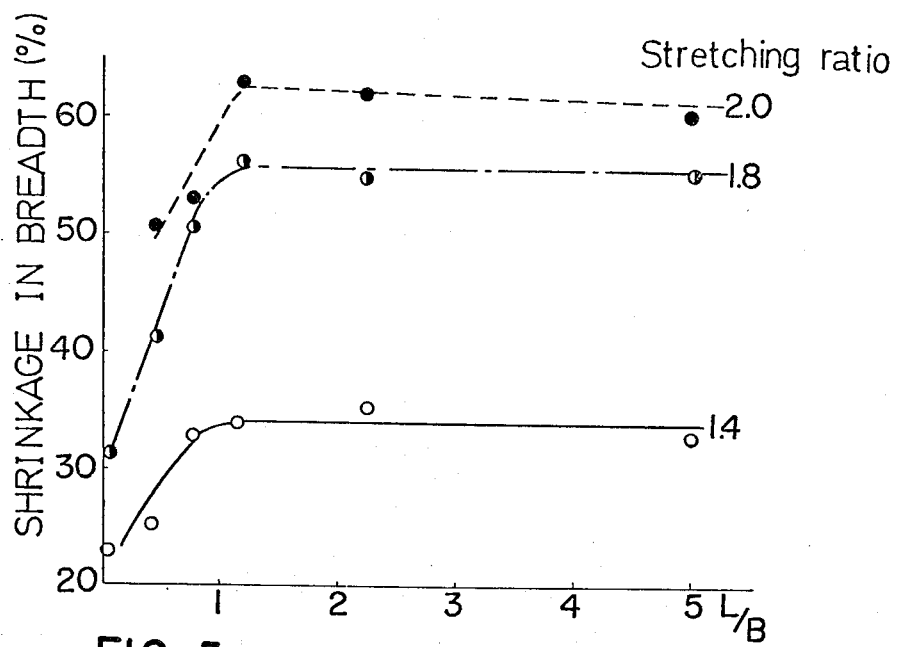
FIG. 4 is a graph showing the relationship between L/B and the rate of shrinkage in breadth.

Change in film thickness, the amount of variation in thickness and the amount of breadthwise shrinkage with L/B and the stretching ratio are shown in FIGS. 2, 3 and 4, respectively. These graphs are based on the results obtained by stretching biaxially oriented polypropylene films having a thickness of 18μ at stretching ratios of 1.4, 1.8 and 2.0, respectively, in the longitudinal direction at 110° C., these films having been obtained by stretching polypropylene films having a intrinsic viscosity ($\eta$) of 2.4 dl/g (measured in tetralin solvent at 135° C.) at a stretching ratio of 4.5 in the longitudinal direction and of 8.5 in the lateral (latitudinal) direction.

The variation of film thickness was calculated on the basis of measurements made with 50 film samples based on their thickness at 20cm intervals in the lengthwise direction and according to the following formula:

$$\text{Variation in thickness (\%)} = \frac{\text{(Maximum thickness)} - \text{(Minimum thickness)}}{\text{(Average thickness)}} \times 100$$

The breadthwise shrinkage was calculated on the basis of the measurement of the width of the film after stretching (W) as compared with the pre-stretching width of the film ($W_o$) and according to the following formula:

$$\text{Breadthwise shrinkage (\%)} = \frac{(W_o - W)}{W_o} \times 100$$

Figure 5:
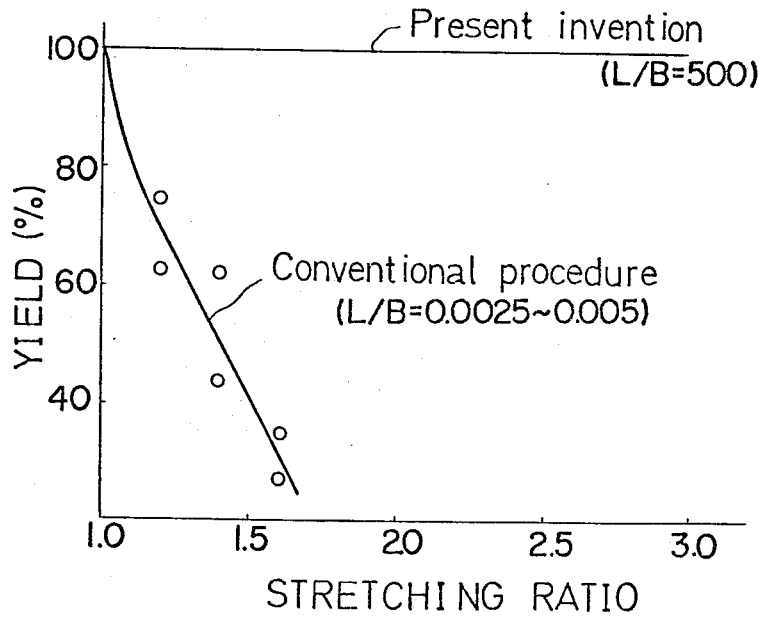
FIG. 5 is a graph showing the relationship between the stretching ratio and yield.

As can be seen from the accompanying graphs, when L/B is close to zero, the stretching of the film in the longitudinal direction entails only a minor shrinkage in the breadthwise direction, and it follows that the thickness of the film so stretched is thinner than the thickness of the biaxially oriented film prior to the stretching step, specifically 18μ. In conventional short distance stretching, L is narrower, i.e., less than B, or to put this relationship into more concrete terms, L/B is usually less than 0.02, and even a minor variation therefrom is likely to result in a relatively large change in thickness. Therefore, it has been necessary to hold L constant by fixing the stretching point at which necking stretching takes place, thereby preventing a variation in thickness. As L/B becomes close to 1, the amount of breadthwise shrinkage increases and the film becomes thicker than its original thickness. When L/B is greater than 1, the amount of breadthwise shrinkage, as well as the film thickness, becomes almost constant. When the stretching ratio is 1.4, the resulting film thickness is greater than the thickness of the original film. As the stretching ratio increases, the amount of film shrinkage becomes greater and, simultaneously, the film thickness increases. When L/B is greater than 1, the rate of variation in film thickness decreases to about 2–4% or less. This is particularly true when the stretching ratio is sufficiently substantial, whereby the variation in film thickness decreases to 1% or less. In other words, when the stretching ratio L/B becomes sufficiently large, a film of uniform thickness or a film which is almost free from any thickness variation is obtained. It thus follows that when L/B is more than 1, the film shrinks uniformly in the breadthwise direction without producing any incongruous thick portions on both edges of the film. In the conventional methods, as the stretching ratio increases, the thickness of both edge portions of the film increases disproportionately, and such disproportional edge portions have to be trimmed, resulting in a sharp decline in the amount of the stretched film obtained, as is shown in FIG. 5. On the other hand, the film stretched in accordance with the present invention does not require trimming, and even if the stretching ratio is increased, the yield remains 100% constant. In the present invention the ratio of the length of the stretching zone to the breadth of the film ranges from greater than 1 to 500.

The yield is calculated according to the following formula:

$$\text{Yield (\%)} = \frac{B}{A} \times 100$$

where the weight of the film prior to stretching is (A), and the weight of the product (film after stretching), the deviation in thickness thereof as compared with the unstretched film being ± 5%, is (B).

When the product obtained after stretching a biaxially oriented film in one direction is heat-treated at a temperature above its second order transition point but below its melting point for a period of 0.1 to 10 minutes, the mechanical properties of the film are further improved. This heat-treatment may be given under a tension just sufficient to avoid a slackening of the film or under a relaxed condition.

According to the present invention, the film, shrinks more or less in the breadthwise direction because of stretching, but the film obtained has a flat surface and is evenly oriented in the breadthwise direction, free from any disproportionately thick edge portions, and thus, a 100% yield, i.e., substantial efficiency, is assured. In the conventional short distance stretching procedures, it is possible for the film to break if a relatively high stretching ratio is applied, making it difficult to increase the stretching ratio to more than 2. With the method of the present invention, however, it is possible to stretch a film at a high stretching ratio. Moreover, the film obtained by this invention is higher in tensile strength than that obtained by a conventional short distance stretching procedure. The thickness of the final product remains almost the same as that of the original film. Therefore, a decrease in thickness due to stretching needs not be considered. This also indicates that it is possible to obtain a relatively thick film from a thin film. Stretched films which are obtained according to the method of this invention are biaxially oriented films having a high tensile strength in one direction.

The following Examples are given merely as illustrative of the present invention and are not to be considered as limiting. In the Examples, the properties of the films are measured according to the following methods:

(1) Tensile strength and tensile elongation determined according to JIS-Z 1702;

(2) Young's Modulus measured on the basis of the inclination of the straight line portion within the proportional limit of a stress-strain curve.

EXAMPLE 1

A biaxially oriented film having a thickness of 18μ, which was obtained by extruding isotactic polypropylene of an intrinsic viscosity of 2.1 (measured in tetralin solvent at 135° C.) in the melt state and, after cooling, stretching the resulting film at a longitudinal stretching ratio of 4.2 and a lateral stretching ratio of 8, was again stretched at a stretching ratio of 2 while being heated at 110° C. In this instance, L was kept at 15 cm, B at 5 cm, and L/B at 3, and as the result a film having thickness of 21μ was obtained.

For the purpose of comparison, an identical sample of biaxially oriented film was subjected to a short distance stretching operation, in which L was kept at 1 mm, B at 200 mm, and L/B at 0.005, at a stretching ratio of 1.6, keeping the temperature of the roll surface at 110° C. The product thus obtained was a film having a thickness of 13μ.

These films were both heat-set at 155° C. under tension for a duration of 10 seconds. The test results of the films were as follows:

|  | Example 1 | Reference Example |
| --- | --- | --- |
| Shrinkage in width (%) | 58 | 32 |
| Yield (%) | 100 | 63.4 |
| Film thickness (μ) | 21 | 13 |
| MD Tensile strength (kg/cm$^2$) | 3050 | 1974 |
| MD Breaking elongation (%) | 37 | 57 |
| MD Young's Modulus (kg/cm$^2$) | 25300 | 7710 |

EXAMPLE 2

A biaxially oriented film having a thickness of 60μ, which was obtained by stretching an isotactic polypropylene film at stretching ratios of 3.5 in the longitudinal direction and 6 in the lateral direction, respectively, was again stretched at stretching ratios of 2.5 and 3.0, respectively, in the longitudinal direction, keeping L/B at 50. In this instance, stretching was effected by passing the film through a heating zone heated by means of hot air of 150° C. for about 15 seconds.

The test results are as follows:

|  | Before stretching | Stretching ratio | |
| --- | --- | --- | --- |
|  |  | 2.5 | 3.0 |
| Thickness (μ) | 60 | 70.8 | 60 |
| Thickness variation (%) | — | 113 | 118 |
| MD Tensile strength (kg/cm$^2$) | 1100 | 3251 | 3557 |
| MD Elongation (%) | 156 | 35 | 42.5 |
| MD Young's Modulus (kg/cm$^2$) | 7000 | 29750 | 28560 |

EXAMPLE 3

A biaxially oriented film having a thickness of 50μ, which was obtained by stretching a polyethylene terephthalate (intrinsic viscosity, 0.63) film at a longitudinal stretching ratio of 3.0 and a lateral stretching ratio of 3.2, was again stretched at a stretching ratio of 1.5, keeping L/B at 4. In this instance, the heating temperature was kept at 120° C. at heating device 4a, at 160° C. at heating device 4b and at 150° C. at heating device 4c, while the heat-setting temperature was kept at 200° C.

For the purpose of comparison, an identical sample of biaxially oriented film was stretched at a stretching ratio of 1.5 with L at 1.0 mm, B at 300 mm, L/B at 0.003, and the surface temperature of the roll at 140° C., and then the film was heat-set at 200° C.

The test results are as follows:

|  | Example 3 | Reference Example |
| --- | --- | --- |
| Original thickness (μ) | 50 | 50 |
| Thickness after stretching (μ) | 72 | 37 |
| Shrinkage in width (%) | 38 | 8.3 |
| Yield (%) | 100 | 65 |
| MD Tensile strength (kg/cm$^2$) | 3960 | 2200 |
| MD elongation (%) | 20 | 80 |

EXAMPLE 4

A biaxially oriented film having a thickness of 17μ, which was achieved by extruding poly-δ-caprolactam having a relative viscosity of 3.1 in the melt state at 280° C. and stretching the resulting film at a longitudinal stretching ratio of 3.2 at 80° C. and at a lateral stretching ratio of 3.5 at 95° C., was again stretched longitudinally at stretching ratios of 1.3, 1.6 and 1.8, keeping L/B at 3. In this instance, the heating temperature was kept at 140° C. at heating device 4a, at 160° C. at heating device 4b and at 170° C. at heating device 4c. Heat-setting was effected under tension at 175° C. for about 10 seconds.

For the purpose of comparison, an identical sample of biaxially oriented film was stretched at a stretching ratio of 1.5 with L at 1 mm, B at 200 mm, L/B at 0.005, and the surface temperature of the roll at 160° C., and then the film was heat-set as above.

The test results are as follows:

| | Before stretch-ing | Stretching ratio | | | Reference Example |
|---|---|---|---|---|---|
| | | 1.3 | 1.6 | 1.8 | |
| Thickness (μ) | 17 | 16.1 | 17 | 16.2 | 11.5 |
| Shrinkage in width (%) | — | 18 | 37 | 43.4 | 7.5 |
| Yield (%) | — | 100 | 100 | 100 | 60 |
| MD Tensile strength (kg/cm²) | 1228 | 1840 | 2100 | 3000 | 1790 |
| MD Elongation (%) | 38.4 | 26.8 | 22.0 | 16.8 | 18.5 |

The invention being thus described, it will be obvious that the same may be varied in many ways. Such variations are not to be regarded as a departure from the spirit and scope of the invention, and all such modifications are intended to be included within the following claims.

What is claimed is:

1. In a method for further stretching a biaxially oriented polypropylene film in one direction, the improvement which comprises obtaining a uniform thickness in the resulting stretched film by stretching said film at a stretching ratio of greater than one and not more than three in a stretching zone heated at a temperature of from 60 to 165° C., said stretching zone having a longitudinal distance greater than the breadth of said film to obtain a film having a thickness greater than the thickness of said biaxially oriented film before said further stretching step, the ratio of the length of the stretching zone to the breadth of the film being greater than 1 to 500.

2. The method of claim 1, further comprising the step of heat-treating the resultant stretched film at a temperature above its second order transition point but below the melting point thereof.

3. In a method for further stretching a biaxially oriented polypropylene film in one direction, the improvement which comprises conveying said film in the direction of stretching to a stretching zone, further stretching the film in one direction in said zone at a stretching ratio greater than one and not more than three and at a temperature of from 60 to 165° C., the stretching zone having a length in the direction of stretching which is greater than the breadth of said film, to give a film having a uniform thickness greater than the thickness of said biaxially oriented film before said further stretching step, conveying the stretched film in the direction of stretching to a heat-setting zone, and heating the stretched film in said heat-setting zone at a temperature above the second order transition point of the film but below the melting point thereof, the heat-setting step being conducted at a tension no greater than that required to avoid a slackening of the film, the ratio of the length of the stretching zone to the breadth of the film being greater than 1 to 500.

4. The method of claim 3, wherein the resulting stretched film has a uniformity of thickness which varies no more than ±5% from the thickness of the unstretched film.

5. The method of claim 3, wherein said film is conveyed between a plurality of low speed feed rollers to the stretching zone and is further conveyed between a plurality of high speed stretching rollers to the heat-setting zone.

6. The method of claim 3, wherein said film is stretched in said stretching zone at a stretching ratio of from 1.3 to 3.0.

7. In a method for further stretching a biaxially oriented polypropylene film in one direction, the improvement which comprises further stretching said film in one direction at a stretching ratio greater than one and not more than three, while being maintained at a temperature of from 60° to 165° C. in a stretching zone having a length in the direction of stretching which is greater than the breadth of said film, said temperature being maintained in said film throughout the entire extent of said stretching zone, to give a stretched film having a uniform thickness which is substantially the same, or greater than, the thickness of the unstretched film, with all of the material originally present in the unstretched film being present in the stretched film, the ratio of the length of the stretching zone to the breadth of the film being greater than 1 to 500.

8. The method of claim 7, further comprising the step of heat-treating the resultant stretched film at a temperature above its second order transition point but below the melting point thereof.

9. In a method for further stretching a biaxially oriented polypropylene film in one direction, the improvement which comprises conveying said film to a stretching zone, further stretching the film in one direction at a stretching ratio greater than one and mot more than three while being maintained at a temperature of 60 to 165° C. in the stretching zone having a length in the direction of stretching which is greater than the breadth of said film, said temperature being maintained in said film throughout the entire extent of said stretching zone, to give a stretched film having a uniform thickness which is substantially the same, or greater than, the thickness of the unstretched film, with all of the material originally present in the unstretched film being present in the stretched film, conveying the stretched film from the stretching zone to a heat-setting zone, and heating the stretched film in said heat-setting zone at a temperature above the second order transition point of the film but below the melting point thereof, the heat-setting step being conducted at a tension no greater than that required to avoid a slackening of the film, the ratio of the length of the stretching zone to the breadth of the film being greater than 1 to 500.

10. The method of claim 9, wherein the resulting stretched film has a uniformity of thickness which varies no more than ±5% from the thickness of the unstretched film.

11. The method of claim 9, wherein the film is conveyed between a plurality of low speed feed rollers to the stretching zone and is further conveyed between a plurality of high speed stretching rollers to the heat-setting zone.

12. The method of claim 9, wherein said film is stretched in said stretching zone at a stretching ratio of from 1.3 to 3.0.

13. The method of claim 9, wherein the polypropylene is stretched at a stretching ratio of from 1.2 to 3.0 in said stretching zone.

14. The method of claim 9, wherein the ratio of the length of the stretching zone in the direction of stretching with respect to the breadth of the film is from 3 to 50.

15. The method of claim 11, wherein the low-speed feed rollers and the high-speed stretching rollers are disposed in a staggered relationship with respect to each other so that the film is conveyed between the low-speed feed rollers and the stretching zone in a serpentine manner and is further conveyed between the high-speed stretching rollers and the heat-setting zone in a serpentine manner.

* * * * *